Dec. 30, 1930.   L. C. FOUNTAIN   1,787,366
PLOW POINT
Filed Dec. 14, 1928
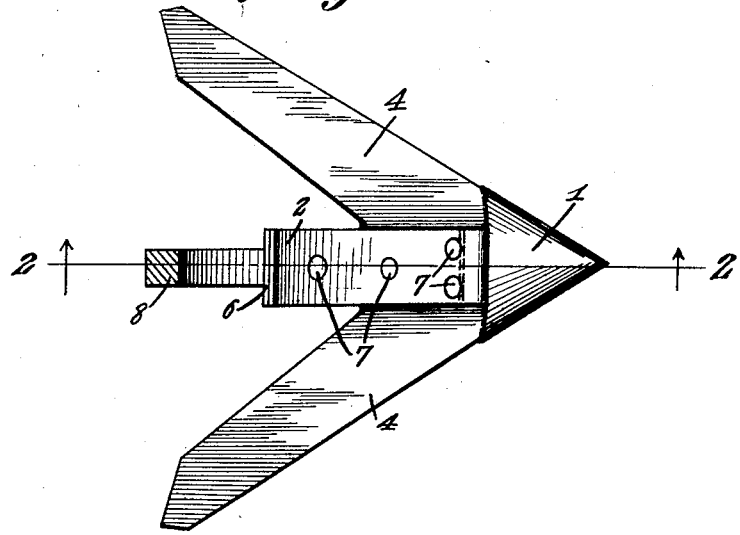
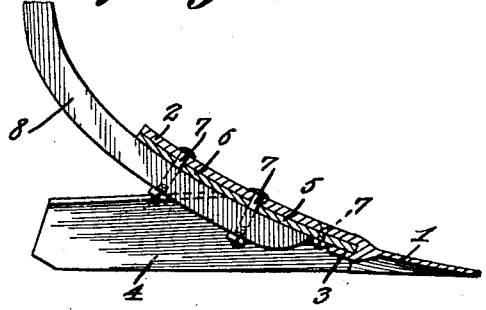
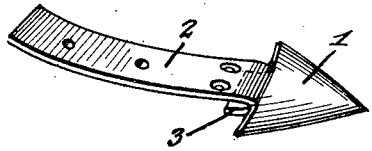
L. C. Fountain, INVENTOR
BY Victor J. Evans
ATTORNEY Patented Dec. 30, 1930

1,787,366

UNITED STATES PATENT OFFICE

LEE COY FOUNTAIN, OF KINGSBURG, SOUTH CAROLINA, ASSIGNOR OF ONE-THIRD TO FRANKLIN ELI WEAVER, OF HYMAN, SOUTH CAROLINA

PLOW POINT

Application filed December 14, 1928. Serial No. 325,948.

This invention relates to a plow point of the sweep type, the general object of the invention being to make the point detachable so that it can be substituted by a new one when it becomes worn and to provide a recess in the point for receiving a part of the sweep to interlock the parts.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a plan view of the plow.

Figure 2 is a section on line 2—2 of Figure 1.

Figure 3 is a perspective view of the point.

In these views, the numeral 1 indicates the point which is of substantially triangular shape and which is formed with a slightly curved shank 2 which extends rearwardly from the base of the point. A short extension 3 or lip also extends rearwardly from the base of the point and is arranged under the shank and is spaced therefrom to form a socket. The sweep part of the plow is formed with the usual convergent wings 4 and the substantially flat central portion 5, and this central portion has a rear extension 6. The parts 5 and 6 are so shaped as to conform to the shape of the shank 2 so that the shank will rest upon these parts when the point is in position, and the front end of the flat part 5 enters the socket formed by the tongue 3, as clearly shown in Figure 2. Bolts 7 extend through the parts 5 and 6 and the shank 2 and some of these bolts pass through the plow beam 8.

Thus it will be seen that the point and its shank can be easily and quickly removed when the point becomes worn so that a new point can be substituted for the worn one. The socket and the front end of the part 5 form interlocking means between the point and the sweep.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A plow comprising a body formed of convergent wings and a substantially flat central part, a rear extension on the central part, a point having a shank extending rearwardly and covering the flat central part and the extension, a short tongue connected with the rear end of the point and spaced below the shank for forming a socket for receiving the front end of the central part of the body and bolts for connecting the shank with the central part of the body and both parts to a beam.

In testimony whereof I affix my signature.

LEE COY FOUNTAIN.